(12) United States Patent  (10) Patent No.: US 9,310,506 B2
Fuller et al.  (45) Date of Patent: Apr. 12, 2016

(54) RESERVOIR MAPPING WITH FRACTURE PULSE SIGNAL

(75) Inventors: Brian Fuller, Littleton, CO (US); John Marcus Sterling, Houston, TX (US); Les G. Engelbrecht, Littleton, CO (US)

(73) Assignee: Sigma Cubed, Inc., Houston, TX (US)

( * ) Notice: Subject to any disclaimer, the term of this patent is extended or adjusted under 35 U.S.C. 154(b) by 1134 days.

(21) Appl. No.: 13/382,872

(22) PCT Filed: Jun. 10, 2011

(86) PCT No.: PCT/US2011/040091
§ 371 (c)(1),
(2), (4) Date: Jan. 6, 2012

(87) PCT Pub. No.: WO2011/156788
PCT Pub. Date: Dec. 15, 2011

(65) Prior Publication Data
US 2012/0106292 A1 May 3, 2012

Related U.S. Application Data

(60) Provisional application No. 61/223,666, filed on Jul. 7, 2009, provisional application No. 61/353,527, filed on Jun. 10, 2010.

(51) Int. Cl.
*G01V 1/00* (2006.01)
*G01V 1/42* (2006.01)

(52) U.S. Cl.
CPC ..................................... *G01V 1/42* (2013.01)

(58) Field of Classification Search
CPC .......... G01V 1/305; G01V 1/307; G01V 1/42
USPC ........................................ 367/25, 27, 30, 38
See application file for complete search history.

(56) References Cited

U.S. PATENT DOCUMENTS

| 6,868,039 | B2 * | 3/2005 | Broto ............................. 367/73 |
| 7,675,815 | B2 * | 3/2010 | Saenger et al. .................. 367/38 |
| 8,688,616 | B2 * | 4/2014 | Fernandez Martinez ....... 706/52 |
| 2011/0022321 | A1 * | 1/2011 | Hulden .................... G01V 1/30 702/14 |

* cited by examiner

*Primary Examiner* — Krystine Breier
(74) *Attorney, Agent, or Firm* — Greenberg Traurig, LLP

(57) ABSTRACT

A method and system includes determining a subsurface fluid seismic attribute comprising recording a signal at a wellhead related to pumping fracture stimulation fluid to obtain a pressure pulse pump signal. A deconvolution operator is determined from the obtained pressure pulse pump signal. Seismic data are acquired from a plurality of sensors. Travel time differences are computed for the seismic data between the plurality of sensor locations and the subsurface position. Seismic data are deconvolved with the deconvolution operator to obtain a plurality of deconvolution coefficients associated with the subsurface position. The computed travel time differences are used to sum the plurality of deconvolution coefficients associated with the subsurface position to obtain a subsurface fluid seismic attribute at the subsurface position.

11 Claims, 10 Drawing Sheets

RESERVOIR MAPPING WITH FRACTURE PULSE SIGNAL

BACKGROUND

1. Technical Field

The present disclosure generally relates to methods and systems for investigating subterranean formations, and particularly to locating reservoir fluids and fluid flow in subterranean formations.

2. Background Information

Hydraulic fracture stimulation is an economically important technology applied to oil and gas reservoirs to increase oil and gas production. Fracturing technology has dramatically increased the available hydrocarbon reserves of the United States over the past several years, particularly its natural gas reserves. During hydraulic fracture stimulation highly pressurized fluids are injected into reservoir rock. The pressurized fluids overcome the breaking strength of the rock and generate fractures that act as pathways by which oil and natural gas can migrate to the borehole and be brought to the surface. The injected fluids, which may reach volumes of 4,000 gallons per minute or more, flow through fractures created by the high-pressure fluids and through previously existing natural fractures in the rock.

SUMMARY

The following presents a general summary of some of the many possible embodiments of this disclosure in order to provide a basic understanding of this disclosure. This summary is not an extensive overview of all embodiments of this disclosure. This summary is not intended to identify key or critical elements of the disclosure or to delineate or otherwise limit the scope of the claims. The following summary merely presents some concepts of the disclosure in a general form as a prelude to the more detailed description that follows.

In one non-limiting embodiment of seismic data processing disclosed herein, the method includes acquiring a seismic dataset while injecting fluids into rock in the subsurface, for example in fracture stimulation of a hydrocarbon reservoir. A deconvolution operator is determined from a signal obtained from a pressure pulse pump signal associated with fracture stimulation fluids, for example, at the well head or associated with a manifold that receives fluids being pumped. These waves associated with the pressure signals travel from the wellhead down the well bore in the fluid and the metal of the well. Seismic data may be recorded in any location before, during and after the fluid injections at multiple spatial locations. Spatial locations may be on the surface or often more advantageously below the surface in a well bore. Seismic travel times are computed between points of interest, for example the seismic receivers and any subsurface point on a grid of points developed with velocity model of the subsurface. Grids, which may be 2-D grids or 3-D volumetric grids, may be regularly spaced or irregularly spaced, any geometric configuration, for example cubic or quadratic grids, tetrahedral grids, grids in spherical, cylindrical or Cartesian coordinates. Travel times between seismic receivers and subsurface points of interest may be used as input to determine a cross correlation coefficient for individual node positions of the subsurface velocity grid/model. Alternatively a plurality of receiver positions may be used as input to a semblance or eigenstructure decomposition multi-channel algorithm. The travel time comparisons between sensors at different positions or levels are used to determine relative time delay position or initial time positions for determining data time series sequences that are input for crosscorrelations, eigenstructure decomposition or other signal subspace methods. In this manner the sensors may be 'aimed' or 'steered' towards each position in the subsurface grid such that a total acoustic energy response may be determined for each node or earth subsurface position and the signal energy extraction enhanced by using longer periods of time series sequences. The coefficient values may be used to determine a value of the acoustic response at each node or subsurface position. These coefficient values may be summed together or otherwise compared with other subsurface node positions to determine the position of fractures, faults, or other fluid filled structures in fluid connection with the perforated pipe used to pump fluid into the reservoir. The method may also be used to track a fluid front moving through the subsurface. For each point of interest, such as grid nodes, computed values of the crosscorrelations may be summed that are delayed from an arbitrary lag by a time equal to the time difference between the associated receiver locations and the point of interest. The results may be displayed to determine the position of fluids in the subsurface. Alternatively the eigenstructure decomposition or semblance values or coefficients are determined for comparison with other subsurface positions.

BRIEF DESCRIPTION OF THE DRAWINGS

The following drawings illustrate some of many possible embodiments in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

Figure 1:
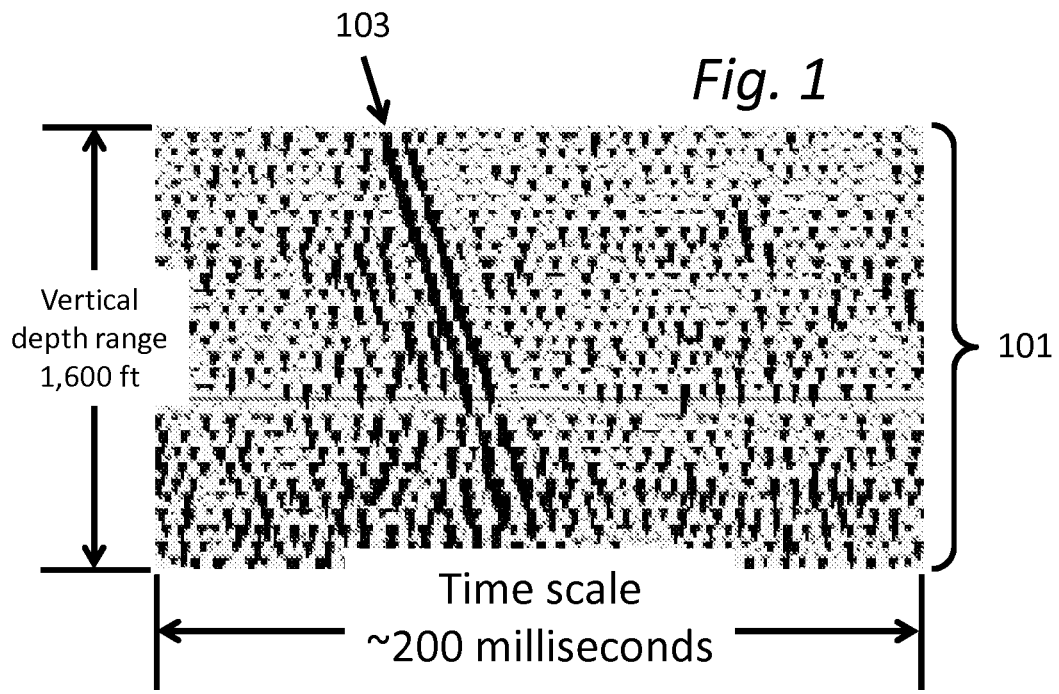
FIG. 1 illustrates a 200 ms seismic data recording of an impulsive seismic event (that could be the result of tensile failure) recorded on seismic borehole receivers distributed over a vertical space of approximately 1,600 ft.

Non-limiting illustrative embodiments of methods or systems for determining subsurface reservoir parameters are presented through one or more various aspects such as those disclosed below. Particular non-limiting embodiments related to fluid flow detection and determining fluid flow position in subterranean formations are described.

Embodiments disclosed herein and equivalents that will be apparent to practitioners in the art provide for robustly estimating position and changes in seismic properties associated with movement of fluids through subsurface reservoirs. Oil, gas, and water flow through reservoirs as these fluids are produced from or injected into the subsurface. Subsequent changes in fluid saturation and pressure likewise produce changes in seismic properties. Collocated time-lapse seismic surveys are recorded to image these changes in saturation and pressure, indicated indirectly through changes in seismic properties. Methods and systems as described herein improve imaging of the location and magnitude of these changes, leading to improved understanding of flow through the reservoir and optimized recovery of hydrocarbons.

Embodiments described herein are seismic data processing methods designed to directly detect and determine the locations at which fluids flow in a rock formation and those locations in fluid connection with a pipe through which fluids are pumped into subsurface rock formations. Detection is enabled due to locating acoustic energy produced by the movement of fluids through the subsurface. Knowledge of where injected fluids flow in the reservoir during stimulation is of significant value to petroleum engineers in that it can allow them to know specifically which parts of the reservoir were contacted by fracture stimulation operations. Remedial actions can then be taken, such as drilling additional wells and running more fracture stimulation treatments to drain parts of the reservoir that were not fractured by the initial fracture stimulation operation. The remedial actions can significantly increase the efficiency of oil and gas recovery from the reservoir and decrease the necessity of developing new or more expensive sources of energy.

Subsurface investigation and mapping technology related to the embodiments disclosed herein are methods of microseismic or seismic fracture mapping. In microseismic methods as practiced in contrast to embodiments described herein, small earthquakes, or "microseisms", which occur in response to injection of fluid in the reservoir are analyzed directly. These discrete seismic events (see example in FIG. 1) are recorded by seismometers placed in the nearby area. Through a variety of data processing methods the location, or focus, of the small earthquakes can determined. The location at which the rocks break in response to high-pressure fluid injection is inferred to be locations at which fracture stimulation fluids have flowed into the reservoir rock. In contrast, the inputs to embodiments disclosed herein are not dependent on whether discrete seismic events are visible on seismic records.

The inference of fluid flow locations from microseisms or seismic fracture mapping is indirect and incomplete. For example it has been observed that in some cases rocks do not generate observable seismic events during fluid injection even though large volumes of fluid are injected into the reservoir and hydrocarbons subsequently produced from the reservoir. Thus it is clear that fluid pathways were created in the reservoir as a result of hydraulic fracture stimulation but the discrete seismic events related to breaking rocks, events that many microseismic mapping methods are dependent upon, were not observed.

During hydraulic reservoir stimulation the injection fluids are pumped down the well bore, exit the well bore through a port, and then forced through constricted space (fractures in rocks). The pressure pulse energy generated by pumping the fluids is transmitted in the fluids and the well bore metal along the same path the fluid moves. The fluid imparts the seismic energy to the rock formation. Resonant and otherwise dynamic and vibratory behavior of the fluids in the rocks occurs as pressure waves imparted to surrounding rock as fluids interact with the rock media and the random tortuous fluid pathways in the reservoir rock. The resonant action could even include a random or chaotic component due to damping of the oscillating system as the surrounding rock absorbs the acoustic energy. Regardless of the exact resonant and vibratory characteristics, seismic waves that are generated by the pumping equipment, travel in the fluid from the surface facilities and into the formation and propagated through the rock. The seismic signal can be recorded on appropriately placed seismometers, including 3-component sensors and pressure sensors, and inverted as outlined in embodiments disclosed herein to determine the location of fluid pathways, fractures and fluid flow, as well as the position of the fluid flow front, in the reservoir regardless of whether rock fracturing events are observable in the seismic recordings.

The seismic signal generated by the pumping equipment that is imparted to the frac-fluid and well bore, here called a fluid pump signal, is used a correlation operator to determine where in the subsurface formation the fluid is present. The fluid pump signal is a continuous, semi-continuous or intermittent signal recorded over relatively long periods of time rather than the relatively brief higher-amplitude signal of a few milleseconds duration recorded when rocks break. Embodiments herein are directed to seismic signal processing methods that directly detect the location of subsurface fluids that are in communication with the fluid from the well bore as well as detecting the location of fluid flowing through the subsurface formations.

In contrast to embodiments presented herein, event-picking microseismic location methods rely upon discrete, short time duration signal represented in the seismic section illustrated in FIG. 1. These are often referred to as "triggers." Embodiments presented here are based upon seismic signals generated and recorded over long periods of time.

FIG. 1 illustrates a seismic record 101 using many sensors at several levels in a borehole of an impulsive seismic event 103 (that could be the result of tensile failure) recorded on seismic receivers distributed over a vertical space of approximately 1,600 feet. Each seismic trace (horizontal time series) represents the acoustic energy recorded at one depth level. The seismic event traverses the seismic receivers from near the center bottom of the figure toward the upper left of FIG. 1. This is an example of the type of seismic signals used in commonly-practiced microseismic event location methods. The seismic waves shown in this event 103 occur over a few milliseconds of time and generally stand out against the background environmental signal and noise that is observed elsewhere in seismic records.

Detection of the fluid flow within a reservoir as disclosed herein is not reliant upon the type of high-amplitude discrete seismic signal 103 illustrated in FIG. 1, although various embodiments of the method use data that includes these signals as they may contribute sufficient energy to allow signal event location. Instead, embodiments of the method use seismic signals imparted to the injection fluid over longer periods of time to detect the locations at which fluid flows or other changes in reservoir rock occur that generate seismic signals over a relatively long time period (many seconds to many minutes).

The fluid flow location information derived from the methods disclosed here is of great value to petroleum engineers who can optimize production from reservoirs based on determining where fracture stimulation fluids have accurately been observed within the subsurface.

One or more signal decomposition or signal enhancement, extraction or analysis methods may be used in embodiments presented herein. The methods include multichannel methods such as crosscorrelation, semblance and eigenstructure decomposition. Correlation methods, specifically as a n example cross-correlation is used, but it will be understood that other multichannel signal subspace methods may also be used in various embodiments. Crosscorrelation, which may be performed in the time or frequency domain, is generally known to practitioners of the geophysical or signal processing arts. Equation 1 below expresses a commonly used form of time-domain crosscorrelation.

$$C(z) = a(t) * d(t) = \Sigma a(t) * d(t-z)$$ Equation 1

In Equation 1 the variables $a(t)$ and $d(t)$ represent digital time series. The output of the crosscorrelation, $C(z)$, is a third digital time series that is the crosscorrelation between $d(t)$ and $a(t)$ and is a time-variant measure of similarity between the signal in $a(t)$ and the signal that is within the time-variant function $d(t)$.

The relative time delays for the correlations between receiver locations and points in the subsurface are generally computed via a travel time computation algorithm such as a ray-trace or wavefield-propagation program. Such computational methods are well-known to those who practice the art of seismic imaging. Seismic travel times between two points, say points A and B, are obtained using knowledge of the velocity field between the points, for example a seismic velocity model. The model should reflect as closely as possible the seismic velocities of the earth in the nearby region of the points A and B. Such velocity fields can include anisotropic terms and three-dimensional velocity variations.

An example use of crosscorrelation is the oil and gas exploration method known as Vibroseis. In the Vibroseis technique heavy trucks with special hydraulic equipment are used as a seismic source to propagate a known seismic signal into the earth over a time period varying from a few seconds to many tens of seconds. Seismometers in proximity to the seismic source are used to record seismic signals reflected from rock layers deep in the earth. Vibroseis seismic reflection signals recorded by seismometers are not generally useful in the form of the original recording because the seismic signal that they record is spread over a long period of time and useful signal is not easily recognizable or observable in the seismic data in that form. Application of the crosscorrelation method to the seismic data however is used to extract the signal known to have been input to the earth from the recorded seismic signal. The crosscorrelation method essentially extracts and compresses the long-period input signal into a seismic signal of short time duration but high seismic energy. The result is a seismic signal that might have been observed, other than some phase differences, if the seismic source had been a short duration explosive such as dynamite.

Crosscorrelation is not the only method by which an attribute of a known long time-duration signal can be extracted from a second digital time series, it is used here as an example. An alternative method of extracting similar signals from among multiple data sources is Eigenvector analysis. Such methods are represented herein by the crosscorrelation method but will be understood by practitioners versed in geophysical methods that any method of similar signal extraction and quantification are applicable in application of various embodiments.

Figure 2:
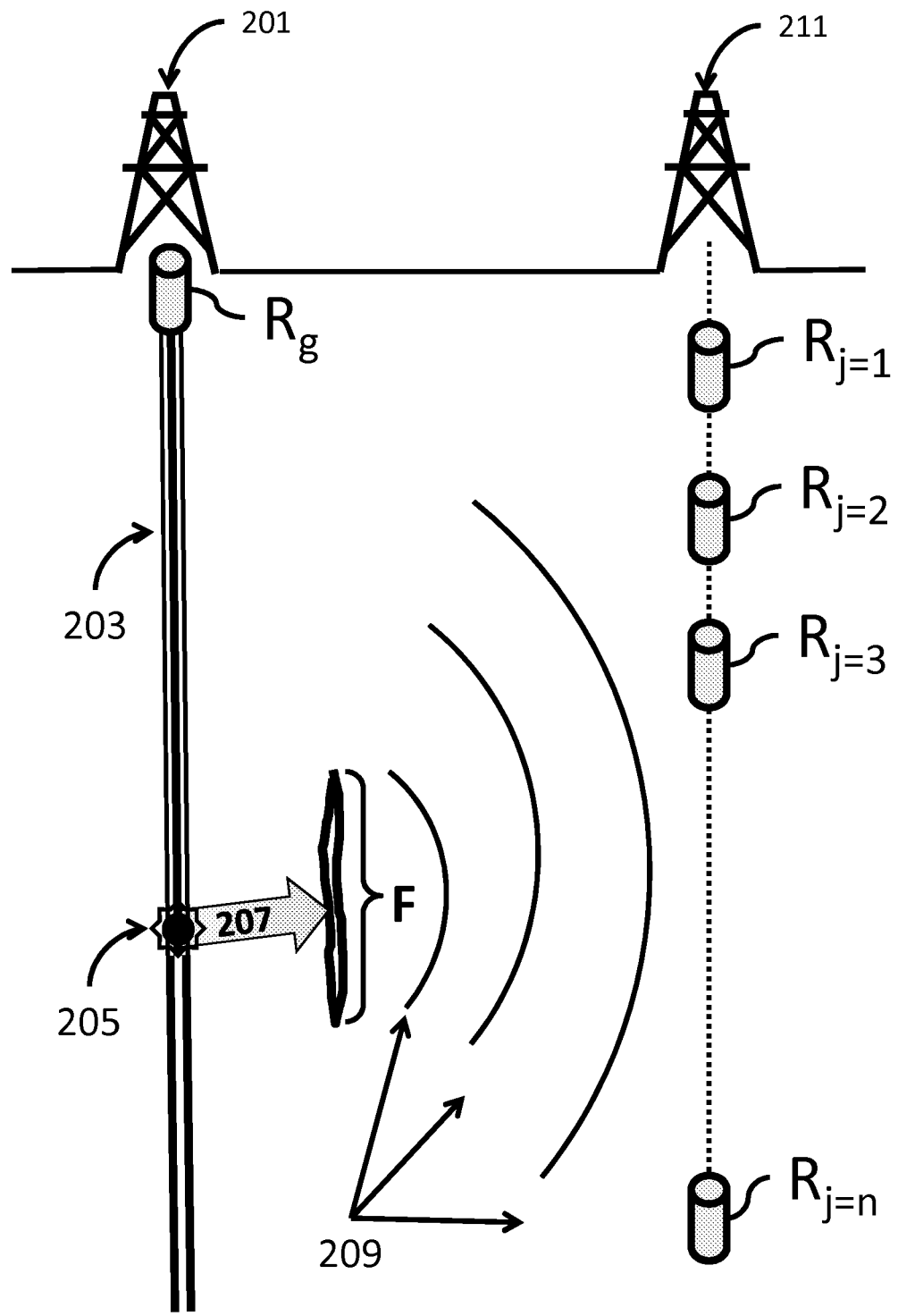
FIG. 2 illustrates schematically a model for fluids flowing through a fracture.

FIG. 2 shows a 2-dimensional cross sectional view of the earth's otherwise 3-dimensional subsurface. The derrick symbol 201 in this instance represents surface facilities associated with a well treatment operation, including but not limited to infrastructure for pumping fluids into the well bore 203 that are further injected into the subsurface at port 205. The fluids are illustrated schematically to flow 207 through arbitrary fracture F. The pumping facilities at 201 create pressure pulses that are transmitted down the borehole, into the reservoir and wherever fluid communication exists.

Pressure pulses travel down the well bore 203 in fluid at around 5,000 feet per second and in the steel infrastructure at around 20,000 feet per second. A majority of the energy imparted by the pumps is transmitted in the fluid. Pressure pulses generated by the frac truck and all other equipment at the surface will be transmitted down the borehole and into the reservoir. Every subsurface location that is in fluid pressure communication with the wellbore generates a compressional wave seismic signal during pumping operations. Those pulses are measure with 3C geophones and other sensors. The acoustic signals that are generated by the high-pressure surface pumping equipment are for example measured by putting 3 component seismometers $R_g$ at the surface facilities 201, such as on or around the wellhead and some other places like frac-pumps or pipelines. The time series $S_g$ recorded by the sensor $R_g$ is used as a reference signal or correlation operator.

A point or opening "F" in FIG. 2 represents a location at which fluid is in pressure communication and seismic energy transmitted from pumps in the vicinity of derrick 201 through the well bore and port 205 and further in communication through a fluid channel 207 in the subsurface enters a fracture F or confined space and is a location from which a seismic signal radiates, thereby emitting seismic wave fronts 209, over a relatively long time period while fluid is in the fracture. The moving fluid will encounter many fractures and will emit acoustic radiation associated with the fracture position in the subsurface. Fluids that were present in fractures prior to injection of fluids from the well port 205 will may also be in fluid communication with the injected fluids and emit acoustic radiation.

Also illustrated in FIG. 2 is a sensor array associated with a well location 211 that includes an array of downhole seismic receiver locations $R_j$ where j is the index of multiple seismic receivers at different locations shown as receiver locations j=1, 2, 3 . . . , n. In FIG. 2 the receivers are depicted geometrically as they would be in a vertical well 211 but it will be appreciated the multiple receivers may be placed in arbitrary locations in three dimensions including the surface of the earth.

Seismic receiver locations are generally assumed to be occupied by multi-component receivers with at least three mutually perpendicular sensors at each receiver location. The use of 3-component geophones at the receiver positions provides discriminatory power as to the actual direction from which energy arrives.

Figure 3:
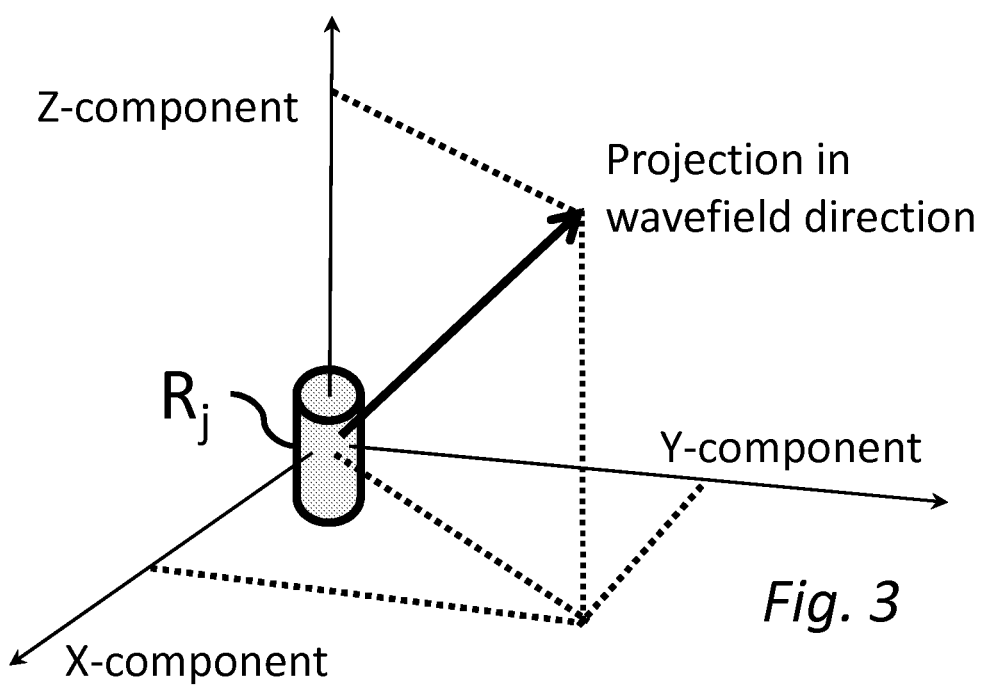
FIG. 3 illustrates a coordinate system for a 3-component geophone with mutually perpendicular components Z, X, and Y.

FIG. 3 illustrates vectors related to an arbitrary three-component sensor $R_j$, such as a geophone or accelerometer, and shows that the direction from which compressional wave energy arrive at a three-component sensor can be determined as the vector sum of simultaneously recorded seismic amplitudes. Signal processing discussed herein may take appropriate advantage of the availability of multicomponent seismic receivers, as would any prudent data processor well versed in the art of multicomponent seismic data processing, including geometric projection of data recorded on multiple receiver components onto other vector directions and separation of wave modes. The particle motion of a wave that passes by a 3-component geophone can be resolved by vector analysis of the waveforms recorded on the respective components. For example, the direction from which seismic compressional waves arrive at a geophone is the vector sum of simultaneously recorded amplitudes on the three mutually perpendicular geophone components.

Figure 4:
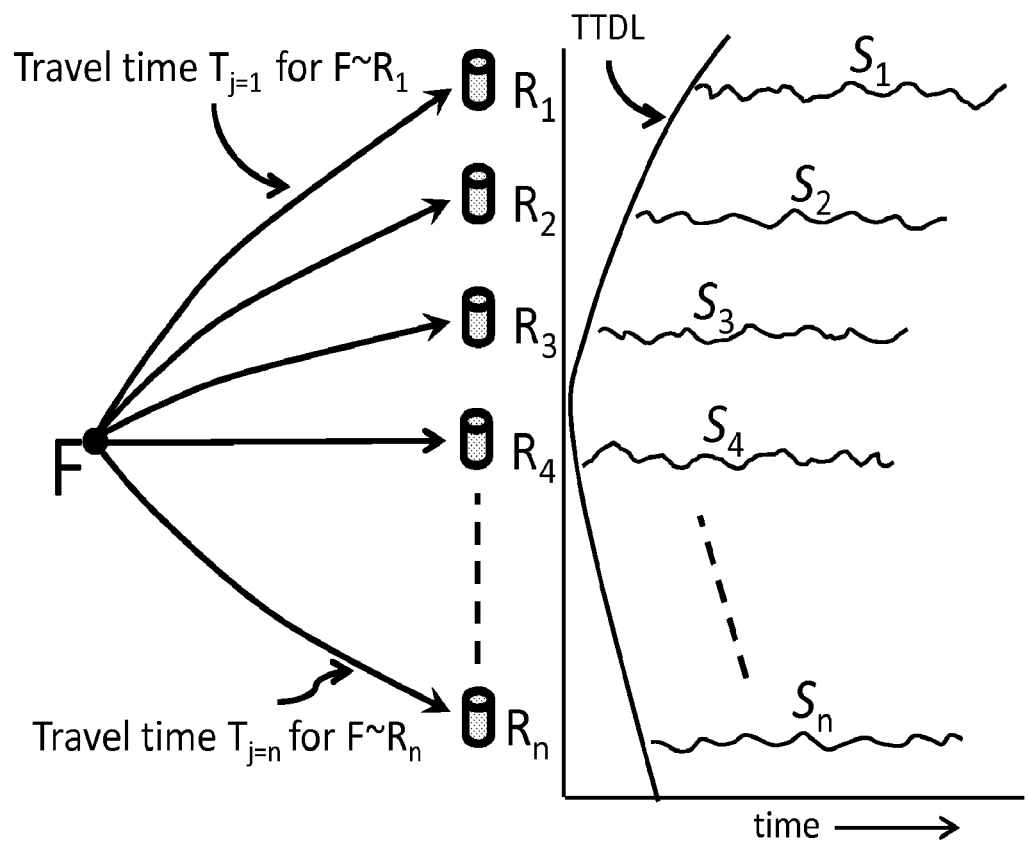
FIG. 4 illustrates schematic seismic ray paths between the point "F" and the receivers $R_i$ where the raypath is annotated $F \sim R_i$.

The seismic wavefield emitted from point F, which represents the position of the source of an acoustic wave emission, will travel to each of the seismic receivers $R_j$ in a time represented here as $T_j$ (FIG. 4). The seismic signal originating from the pumping facilities 201 and being emitted into the subsurface formation at point F is recorded at receiver sondes $R_1$ through $R_N$ as time series $S_1$ through $S_N$, respectively. The seismic travel raypath from a point F to a point $R_j$ is annotated in FIG. 4 as F~$R_j$. The travel time from F to each receiver can be estimated via travel time computations that use any known velocity information derived from any a priori or contemporaneously acquired information including perforation shots, string shots, and geologic structure. In FIG. 4 the seismic signal from F arrives at each sensor at various but predictable times. In all real cases the seismic signal arriving from F will be contemporaneous over time with other signals and noise from other sources. The seismic travel time differential delay surface (TTDL in FIG. 4) between the array of signals arriving at arbitrary receivers $R_i$ and $R^k$ from the point F is expressed as $T_i - T_k = Z_{ik}$. Said another way, the value of $Z_{ik}$ is the travel time difference between the seismic raypaths F~$R_i$ and F~$R^k$. The notation $S_j$ indicates the seismic data time series recorded at receiver index "j".

Suppose now that the seismic signal generated at F is recorded at a plurality of receivers, for example two receivers arbitrarily designated $R_i$ and $R^k$, generating the seismic data time series $S_i$ and $S_k$ respectively over a time period P. Cross-correlation of each of the seismic records $S_i * S_g$ and $S_k * S_g$ over the time period P results in time series, $C_{gi}$ and $C_{gk}$. Provided that other seismic signals are nullified or largely suppressed by the crosscorrelation process, summing the crosscorrelation results ($C_{gi}$ and $C_{gk}$) relative to lag time $Z_{ik}$ that are the travel time differences relative to each grid node being analyzed, the summed result is proportional to the total energy recorded at the receivers $R_i$ and $R^k$ that was transmitted from the grid node F (fracture or fluid flow seismic signal location). Said another way, the crosscorrelation process will have extracted a representation of the signal energy from F that reached the two receivers $R_i$ and $R_k$ with a time delay of $Z_{ik} = T_i - T_k$ over the time period P.

As illustrated with reference to FIG. 4, seismic record $S_j$ is crosscorrelated with pump-pulse seismic record $S_g$ over time period P, to obtain cross correlation output $C_{gj}$. All the cross correlation outputs are summed together with a time offset that is the travel time difference between the grid node at F and each receiver position. The time lags $Z_{gj}$ for j=1 to n are determined by holding all the times relative to one selected receiver $R_j$. The relative time lags between all records $S_j$ form a time surface ('zero lag' delay) that is a function of the position of F, the position of the sensors and the velocity field.

Full discriminatory power of the signals received from each grid node point F can be achieved by forming the sum $$f(F_j) = \Sigma C_{gj}(Z_{gj}) \quad \text{Equation 2}$$

in which $F_j$ represents the signal from the receiver locations j=1 to n and $Z_{gj}$ is the appropriate time delay determined from the relative travel time offset based on F~$R_j$ raypaths (travel time from grid node point F to each Rj). (or similar signal extraction or quantification method). Other signal extraction or quantification methods include eigenstructure decomposition algorithms that use a plurality of receivers will also give results that may be more sensitive to waveforms compared to crosscorrelation or multichannel semblance algorithms, which may also be used.

Figure 5:
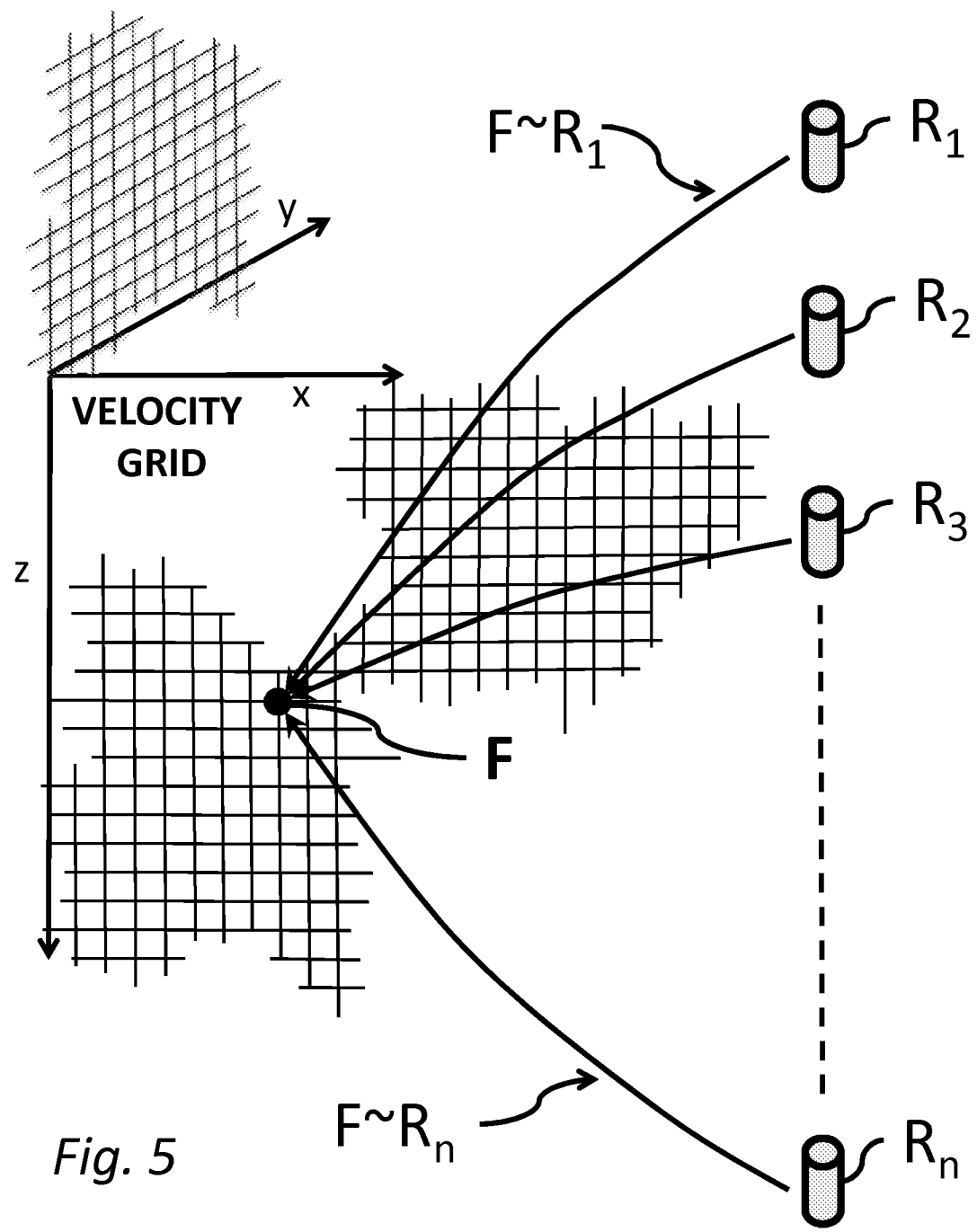
FIG. 5 illustrates the inverse seismic wave paths from sensors to potential fracture position F with a velocity model or grid (schematically represented by a partial mesh) for travel paths from sensors $R_1$ to $R_n$ using one or more embodiments of the methods disclosed herein.

The process described relative to FIG. 4 is further shown in FIG. 5 using a velocity grid for determining travel times between receivers and subsurface positions and the time delay between receivers $R_1$ to $R_n$ and a position in the grid, for example an arbitrary subsurface position F in x, y and z space. While grid positions are schematically illustrated for the Velocity Grid (which while partially illustrated impliedly covers the entire raypath space), all positions are used for a 3-D velocity model. As is well known to practitioners of the geophysical imaging arts, other coordinate systems and geometries may be advantageously used depending on the configurations of the sensors and subsurface structure and properties.

Figure 6:
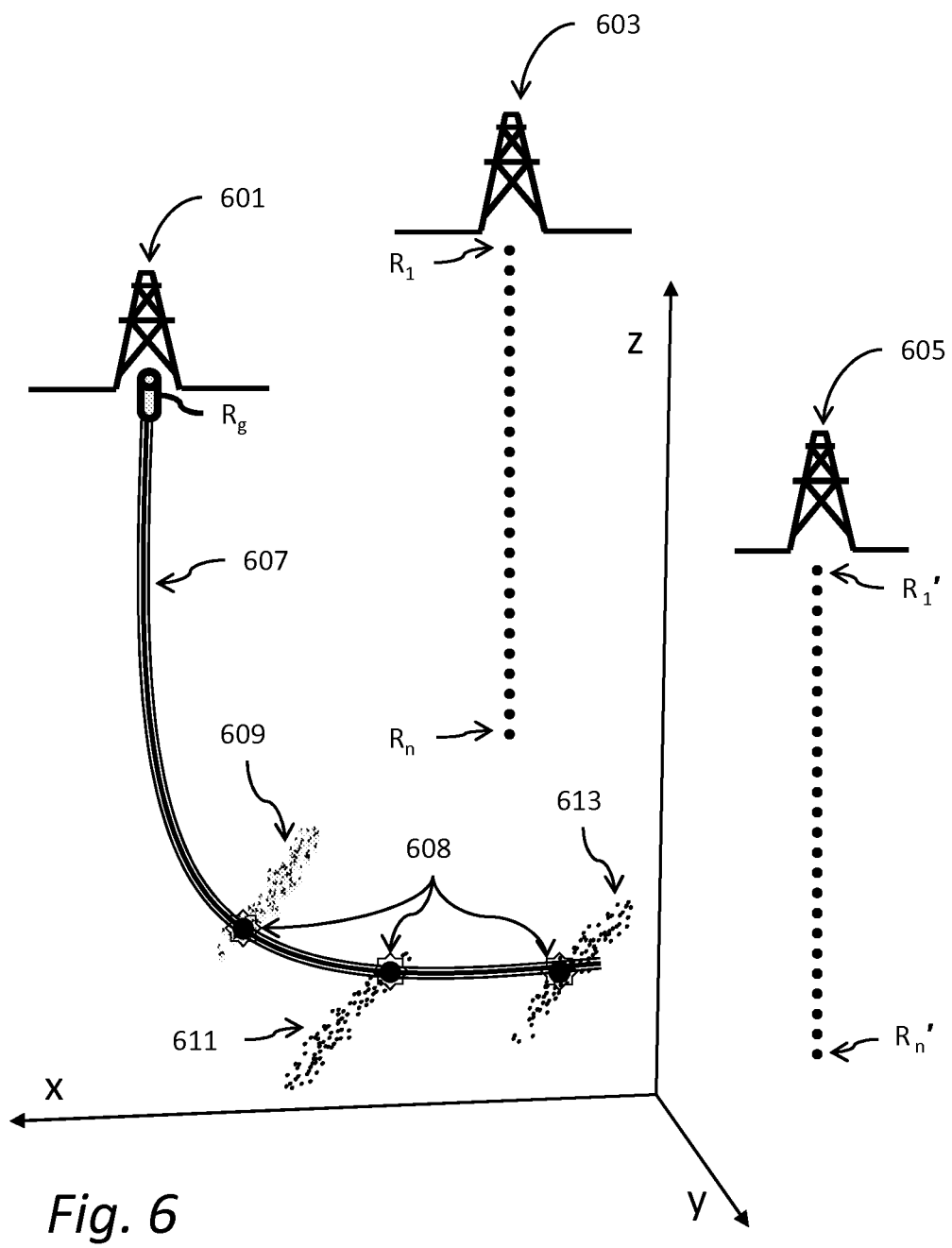
FIG. 6 illustrates acoustic source points determined using one or more embodiments of the methods disclosed herein.

FIG. 6 illustrates an example arrangement for detecting and locating subsurface fluids, fluid flow, and fracture zones. The location process described using Equation 2 with a subsurface model or grid can be applied to focus multiple seismic receivers toward any and all points in a volume to determine an acoustic energy representation value f(F) or "f" for points of interest in the volume. Well location 601 represents a fracture-treatment well that includes sensor $R_g$ for recording the pump pulse signal $S_g$, well bore 607 with ports 608 for injecting fluids into the earth at various locations along the well bore. Well location 603 represents a bore hole with monitoring sensors $R_1$ to $R_n$ that record seismic data $S_1$ to $S_n$. Optionally more monitoring arrays may be used as well, for example well location 605 including sensors $R_1'$ to $R_n'$ that record seismic data $S_1'$ to $S_n'$. Relative time lags $Z_{gj}$ are computed for all sensors used for various time periods P. Sensor recordings $S_1$ to $S_n$ are crosscorrelated using $Z_{gj}$ to determine coefficients $C_{gj}$ associated with the subsurface positions.

The acoustic energy representation value of f(F) in Equation 2 is computed for grid locations in the vicinity of the well bore 607 around port or perforation locations 608. The areas 609, 611 and 613 depicted as clouds of dots are clusters of values above a threshold value. These areas represent fluid flow locations and may be displayed so that the inherent dynamic fluid flow information within the data is depicted relative to time. For example the values at each position may be displayed and/or displayed relative to time or time-relative coloring may be associated with the fluid flow locations and associated values.

The volume areas 609, 611 and 613 are depicted for simplicity of this illustration as discrete static points in FIG. 6 which are above a threshold value of f. The dynamic variability in the values of f at subsurface position in the vicinity of well bore 607 may also be represented as relative values. Values or points as shown in FIG. 6 can be generated for various or progressive time periods, P, thus displays of how fluid flows through a rock volume over time can be created.

Petroleum engineers can use this information to optimize well completion operations and maximize efficiency of reservoir drainage.

The results generated from these computations are used to identify fluid pathways that existed prior to the frac-job. The results of the early minutes of the frac-stimulation help delineate the pre-existing fracture system geometry. This information is useful to suggest which direction to drill to intersect the maximum number of previously existing fracture pathways.

Figure 7A:
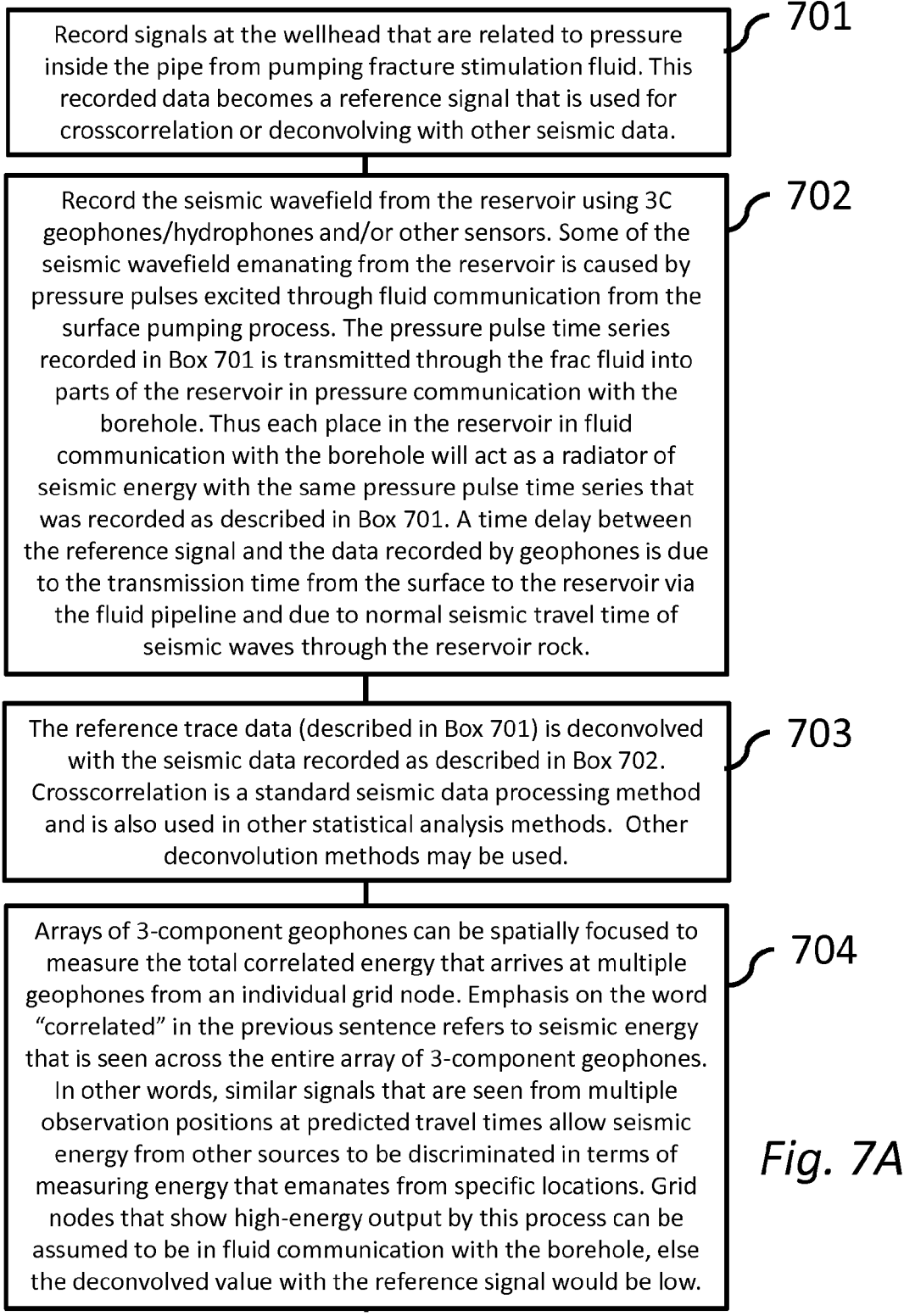
FIG. 7A is a flow chart illustrating a non-limiting embodiment of methods disclosed in the present disclosure.

FIG. 7A illustrates a flowchart of a nonlimiting embodiment wherein Acoustic signals are recorded on wellhead facilities 701. The acoustic signals are related to the pressure inside the pipe from pumping fracture stimulation fluid. The acoustic signal is a reference signal used to correlate or deconvolve with other seismic data. Record the seismic wavefield from the reservoir using 3C geophones/hydrophones and/or other sensors 702. Some of the seismic wavefield emanating from the reservoir is caused by pressure pulses excited through fluid communication from the surface pumping process. The pressure pulse time series recorded in 701 is transmitted through the frac fluid into parts of the reservoir in pressure communication with the borehole. Thus each place in the reservoir in fluid communication with the borehole will act as a radiator of seismic energy with the same or similar pressure pulse time series that was recorded as described in 701. A time delay between the reference signal and the data recorded by geophones is due to the transmission time from the surface to the reservoir via the fluid pipeline and due to normal seismic travel time of seismic waves through the reservoir rock. Crosscorrelate or deconvolve 703 the reference trace data of 701 (e.g., $S_g$) with the seismic data recorded as described in 702 (e.g. $S_1$ to $S_n$). The output of the crosscorrelation or deconvolution process in 703 can be used in a manner similar to part of the Fluid Flow Analysis method. Arrays of 3-component geophones are spatially focused to measure a representation of the total energy that arrives at multiple geophones (R1 to Rn) from an individual grid node (F). The "representation of the total energy" in the previous sentence refers to seismic energy that is seen across the entire array of 3-component geophones. In other words, similar signals that are seen from multiple observation positions at predicted travel times (with known relative time delays) allow seismic energy from other sources to be discriminated in terms of measuring energy that emanates from specific locations. Grid nodes that show high-energy output by this process can be assumed to be in fluid communication with the borehole, else the crosscorrelated/deconvolved or otherwise focused value with the reference signal would be low.

Seismic data are recorded with sensors at multiple spatial locations before, during and after fluids are pumped into the subsurface 707. Traveltime for seismic waves are computed between grid nodes representing subsurface positions and seismic sensors 709. Pluralities of pairs of seismic signals are deconvolved or crosscorrelated 711. As is well known, cross correlation is one form of deconvolution. Other forms of deconvolution include semblance and eigenstructure methods. For subsurface positions of interest (represented by grid nodes) the values derived from the deconvolutions/crosscorrelations that are delayed from a zero lag by a time equal to the time difference between the associated receiver locations and the subsurface position 713 (or point of interest).

Figure 7B:
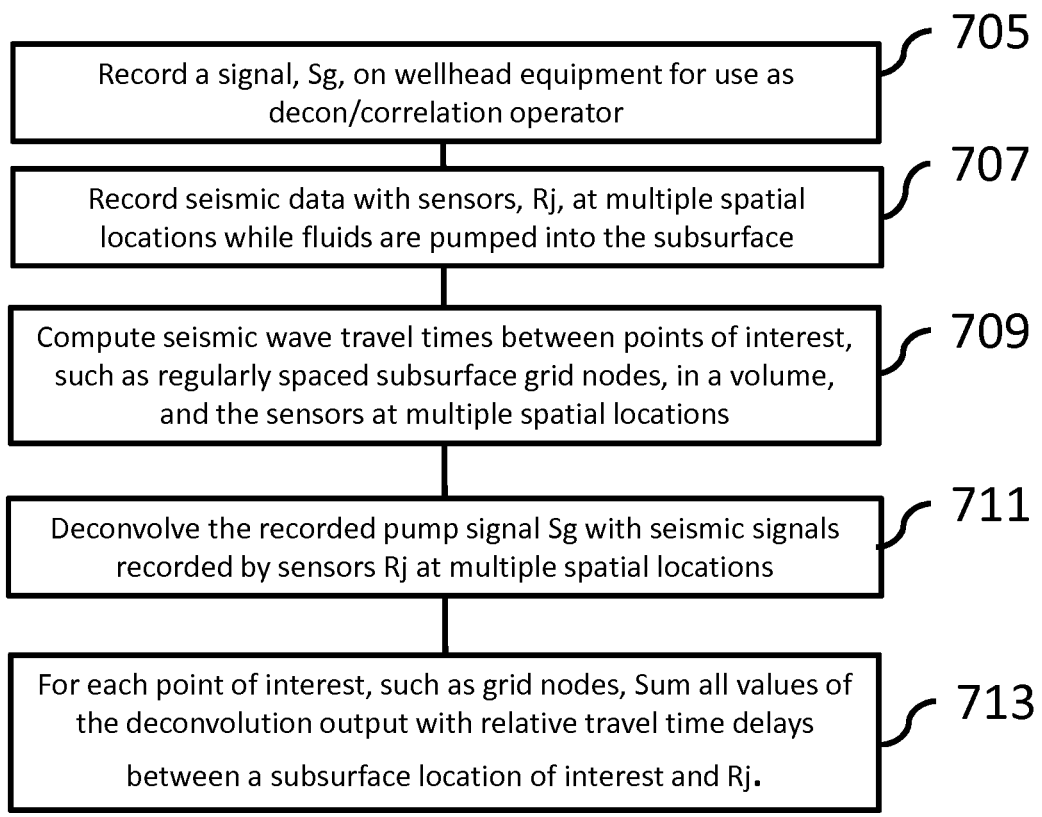
FIG. 7B is a flow chart illustrating a non-limiting embodiment of methods disclosed in the present disclosure.

FIG. 7B illustrates a flowchart of a nonlimiting embodiment wherein fluids are injected into rock in proximity to a reservoir, the fluid injection generating seismic waves 705. Seismic data are recorded with sensors at multiple spatial locations before, during and after fluids are pumped into the subsurface 707. Traveltimes for seismic waves are computed between grid nodes representing subsurface positions and seismic sensors 709. Pluralities of pairs of seismic signals are deconvolved/crosscorrelated 711 to obtain output coefficients. These coefficients represent a subsurface fluid seismic attribute or subsurface pressure pulse signal position For subsurface positions of interest (represented by grid nodes) the values, or pressure-pulse related seismic attribute values, derived from the crosscorrelations or deconvolutions that are delayed from a zero lag by a time equal to the time difference between the associated receiver locations and the subsurface position 713 (or point of interest).

Figure 8:
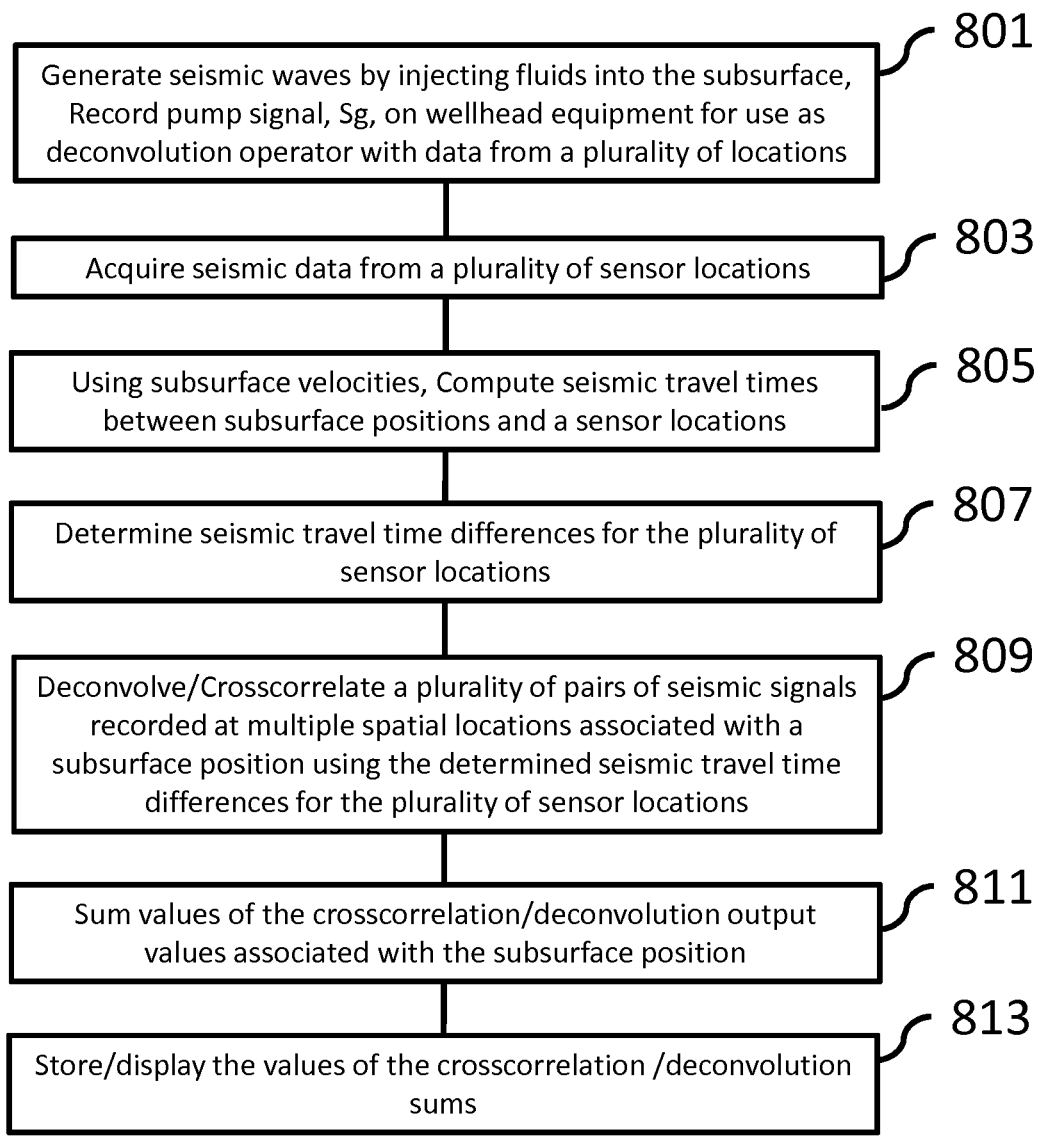
FIG. 8 is a flow chart illustrating a non-limiting embodiment of methods disclosed in the present disclosure.

FIG. 8 illustrates a flowchart of a nonlimiting embodiment wherein seismic waves are generated in the subsurface by injecting fluids 801. Seismic data are acquired from a plurality of sensor locations 803. Seismic wave travel times are computed using subsurface velocities between subsurface positions and the plurality of sensor locations 805. Seismic travel time differences are determined for the plurality of sensor locations 807. A plurality of pairs of seismic signals is crosscorrelated from multiple sensor locations for a subsurface position 809. The values of the crosscorrelations/deconvolutions are summed 811. The summed values of the crosscorrelations/deconvolutions, which represent a fluid related seismic attribute, may be displayed 813. The summed values, a representation of the energy emanating from a subsurface location, may be displayed by position or by position relative to time.

Figure 9:
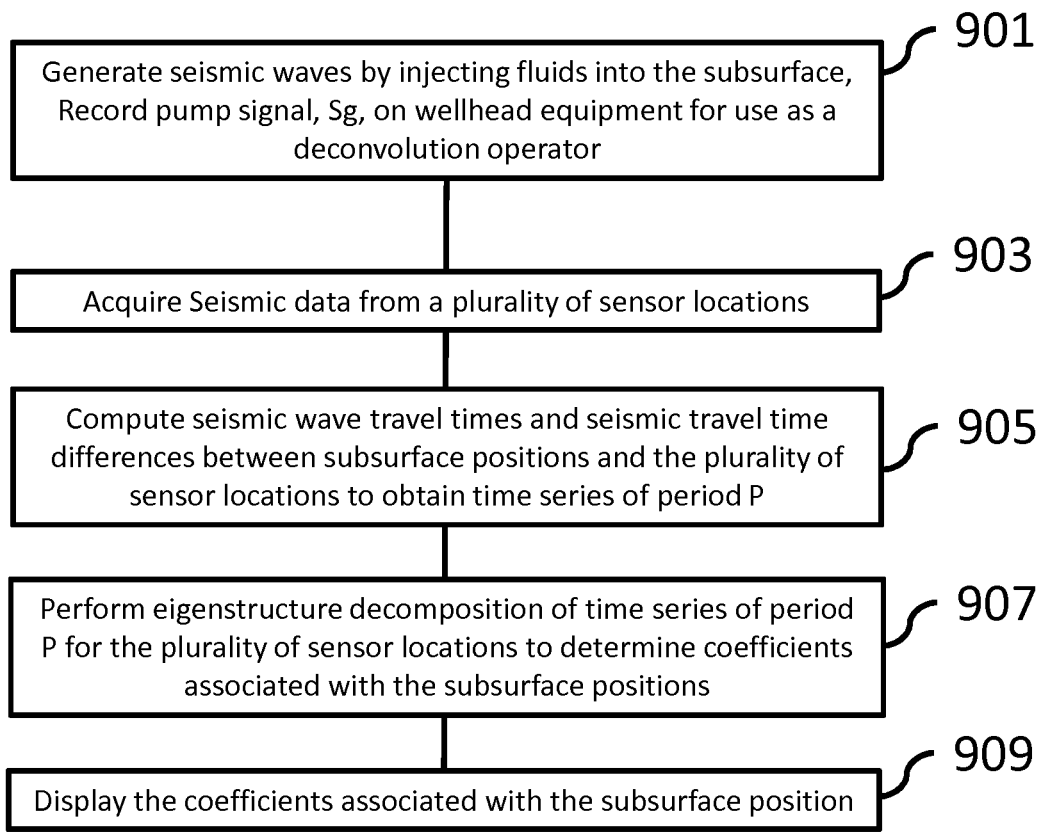
FIG. 9 is a flow chart illustrating a non-limiting embodiment of methods disclosed in the present disclosure.

FIG. 9 illustrates a flowchart of a nonlimiting embodiment wherein seismic waves are generated by injecting fluids into the subsurface 901, which may be recorded. Seismic data are acquired from a plurality of sensor locations 903. Using subsurface velocities, compute seismic wave travel times and relative seismic travel time differences between subsurface positions and the plurality of sensor locations to obtain associated time series of period P, 905. Perform eigenstructure decomposition of associated time series of period P for the plurality of sensor locations to determine coefficients associated with the subsurface positions 907. Display the coefficients associated with the subsurface position 909. These coefficients represent a subsurface fluid seismic attribute or subsurface pressure pulse signal position.

Figure 10:
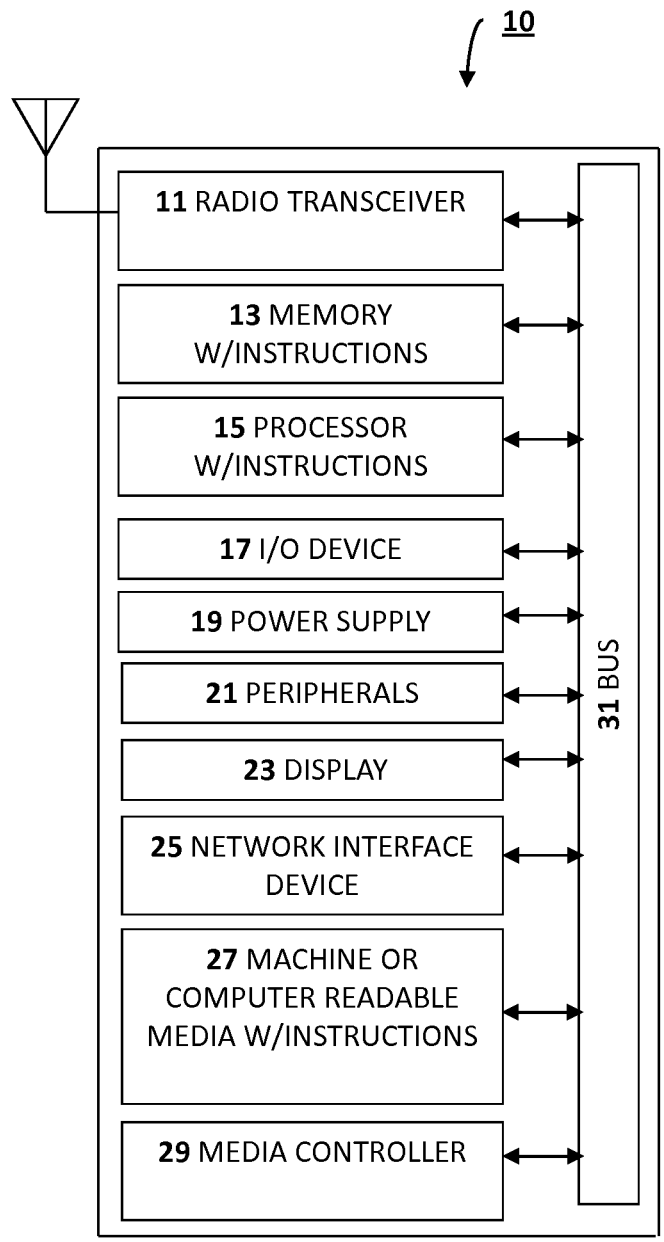
FIG. 10 illustrates an embodiment of a seismic data processing system within which a set of instructions may enable

An example of a seismic data processing system is illustrated with FIG. 10, an embodiment of a seismic data processing system within which a set of instructions may enable the system to perform any of the nonlimiting embodiments or their equivalents disclosed herein for determining the location of fluids flowing in the earth. A seismic data processing system may be a standalone system, computer, host computer, server or blade, or may be connected to other systems within a network. Seismic data processing system 10 may include a radio transceiver 11 connected to an antenna for providing wireless access to systems, networks and devices. In a networked deployment, the seismic data processing system may operate as a server or a client in server-client networked environment or as a member of a distributed network environment. Memory 13 may be volatile or non-volatile memory with instructions, programs and data. One or more central processing units (CPU) 15 or other processors including parallel processors may be included with instructions. The instructions may at least partially reside within the memory 13 and/or within the processor 15 during execution. Memory 13 and processor 15 may include machine-readable media.

Machine-readable media includes solid-state memory such as cards or other non-volatile memories, random access memories or other volatile memories, magneto-optical or optical media (e.g., disk or tape), or signals embodying computer instructions in a transmission medium. A machine-readable medium for the embodiments disclosed herein includes equivalents and successor media.

An input/output device 17 is provided to send data to, or receives data from, other system components or devices. At least one seismic data processing system bus 31 provides communication between and among components.

Additionally, seismic data processing system 10 may include peripherals 21 (keyboards, GPS receivers, USB adapter, headphones, microphone, wireless audio transmitter, print adapter, mouse, serial adapter, etc). Various types of display device 23 may be attached or linked with seismic data processing system 10. Network interface equipment such as Network Interface Controller 25 (NIC) may provide hard-wired access to infrastructure. Other interfaces may include a PCI bus, and USB ports, etc. A machine readable medium with instructions 27 may be on a disk drive device and provide additional software and data storage capability to seismic data processing system 10.

For example, computer readable medium 27 and memory 13 may include programs to process seismic data, which may be stored as program data and seismic data, according to the methods disclosed herein. The application program associated with the computer readable medium 27 may include at least one application program interface for receiving and/or processing seismic data. The program data may include seismic data acquired for processing according to embodiments disclosed herein. A set of application program interfaces residing on computer readable medium 27 or memory 13 may include at least one application interface associated with calculating fluids flowing in subsurface reservoirs or processing data to locate associated temporal changes in subsurface reservoirs, or for determining other subsurface hydrocarbon reservoir parameters.

Processor 15 may carry out graphics/memory controller hub functions and enable input/output (I/O) functions for I/O device 17 and associated peripherals 21. Peripherals 21 such as a mouse, keyboard, and tablet are also coupled to other components at the option of the user. The seismic data processing system bus 31 may connect to I/O devices 17. Non-limiting examples of a seismic data processing system bus may include a Peripheral Component Interconnect (PCI) bus, PCI Express bus, SATA bus or other bus is coupled to enable seismic data processing system bus 31 to be connected to other devices which provide seismic data processing system 10 with additional functionality. A universal serial bus (USB) or other I/O bus may be coupled to seismic data processing system bus 31 to facilitate the connection of peripheral devices 21 to seismic data processing system 10. System basic input-output system (BIOS) may be coupled to processor 15. BIOS software is stored in nonvolatile memory 13 such as CMOS or FLASH memory. A network interface controller (NIC) 25 is coupled to processor 15 to facilitate connection of system 10 to other data, information or seismic data processing systems. A media drive controller 29 is coupled to processor 15 through bus 31. An example of a media drive controller may include a baseboard management controller (BMC). Devices that can be coupled to media drive controller 29 include CD-ROM drives, DVD drives, hard disk drives and other fixed or removable media drives. It should be understood that the technology disclosed herein is not only applicable to the embodiment of FIG. 10 but is also applicable to the other types of seismic data processing systems.

While various embodiments have been shown and described, various modifications and substitutions may be made thereto without departing from the spirit and scope of embodiments illustrated in this disclosure. Accordingly, it is to be understood that various embodiments of the present invention have been described by way of illustrations and not limitation.

What is claimed is:

1. A method for determining a subsurface fluid seismic attribute comprising:
   a) recording a signal at a wellhead related to pumping fracture stimulation fluid to obtain a pressure pulse pump signal;
   b) determining a deconvolution operator from the obtained pressure pulse pump signal, the deconvolution operator determined using one or more of: i) cross-correlation of a plurality of pairs of seismic signals, ii) eigenstructure decomposition, and iii) semblance calculations;
   c) acquiring seismic data from a plurality of sensors;
   d) computing travel time differences for the seismic data between the plurality of sensor locations and the subsurface position;
   e) deconvolving the seismic data with the deconvolution operator to obtain a plurality of deconvolution coefficients associated with the subsurface position; and
   f) using the computed travel time differences to sum the plurality of deconvolution coefficients associated with the subsurface position to obtain a subsurface fluid seismic attribute at the subsurface position.

2. The method of claim 1 wherein computing travel times further comprises:
   using velocities derived from at least one selected from the group consisting of i) a perforation shot, ii) a string shot, iii) surface seismic data, iv) a check shot and v) VSP data.

3. The method of claim 1 further comprising acquiring the seismic data while fluids are injected into subsurface formations through a port in a well bore.

4. The method of claim 1 wherein the plurality of sensors are three-component sensors.

5. The method of claim 1 further comprising storing the obtained coefficients associated with subsurface locations in a form for display.

6. A method of determining a pressure pulse seismic signal value in the subsurface comprising:
   a) acquiring seismic data from a plurality of sensors;
   b) acquiring a pressure reference signal from a pressure sensor associated with a pipe through which fluids are pumped into the earth;
   c) computing a deconvolution output from seismic data associated with the plurality of sensors and the reference signal acquired from the pressure reference signal, the deconvolution output computed using one or more of: i) cross-correlation of a plurality of pairs of seismic signals, ii) eigenstructure decomposition, and iii) semblance calculations;
   d) computing travel time differences for the seismic data between the plurality of sensor locations and the subsurface position;
   e) summing the computed deconvolution output with the computed travel time differences to obtain a pressure pulse seismic signal value associated with the subsurface position.

7. The method of claim 6 wherein computing travel times further comprises:
   using velocities derived from at least one selected from the group consisting of i) a perforation shot, ii) a string shot, iii) surface seismic data, iv) a check shot and v) VSP data.

8. The method of claim 6 further comprising acquiring the seismic data while fluids are injected into subsurface formations through a port in a well bore.

9. The method of claim 6 wherein the plurality of sensors are three-component sensors.

10. The method of claim 6 further comprising storing the obtained coefficients associated with subsurface locations in a form for display.

11. An information handling system for determining a subsurface fluid seismic attribute in the subsurface associated with pumping fracture stimulation fluid comprising:
   a) a processor configured for computing travel time differences between a subsurface position and a plurality of sensors that acquired the seismic data;
   b) a computer readable medium for storing travel time differences for the seismic data between the plurality of sensor locations and the subsurface position;
   c) a processor configured for determining a deconvolution operator from a pressure pump signal associated with a wellhead related to pumping fracture stimulation fluid, the deconvolution operator determined using one or more of: i) cross-correlation of a plurality of pairs of seismic signals, ii) eigenstructure decomposition, and iii) semblance calculations;
   d) a processor configured for using travel time differences to sum a plurality of deconvolution coefficients associated with the subsurface position to obtain a subsurface fluid seismic attribute at the subsurface position.

* * * * *